United States Patent [19]
Ohmann

[11] Patent Number: 5,441,038
[45] Date of Patent: Aug. 15, 1995

[54] GROUND THAW APPARATUS

[76] Inventor: Bruce Ohmann, 1395 Aspen Ct., West St. Paul, Minn. 55118

[21] Appl. No.: 251,028

[22] Filed: May 31, 1994

[51] Int. Cl.⁶ .............................................. F23C 5/00
[52] U.S. Cl. ........................... 126/271.1; 126/271.2 R; 126/91 A
[58] Field of Search ............... 126/271.1, 271.2 R, 126/271.2 A, 271.2 C, 271.3, 389, 21 A, 91 A; 165/45; 405/131, 56, 57, 152, 234; 37/227, 230

[56] References Cited

U.S. PATENT DOCUMENTS

| | | |
|---|---|---|
| 625,711 | 5/1899 | Stevens . |
| 633,691 | 9/1899 | Garvey . |
| 734,141 | 7/1903 | Sink . |
| 1,322,459 | 11/1919 | Mattern . |
| 1,702,546 | 2/1929 | Owens et al. . |
| 2,813,185 | 11/1957 | Smith .................. 126/21 A |
| 2,821,976 | 2/1958 | Fizzell ................ 126/271.2 |
| 2,864,360 | 12/1958 | Love ................... 126/271.2 |
| 2,891,536 | 6/1959 | Ford ................... 126/271.2 |
| 3,132,642 | 5/1964 | Fingland ............. 126/271.2 |
| 3,353,528 | 11/1967 | Robinson ............. 126/91 A |
| 3,688,760 | 9/1972 | Rubin .................. 126/91 A |
| 3,945,370 | 3/1976 | Essington ........... 126/271.3 |
| 4,131,107 | 12/1978 | Godbout ........... 126/271.2 R |
| 4,349,010 | 9/1982 | Bentham ............ 126/271.1 |
| 4,749,303 | 6/1988 | Keizer et al. .......... 404/86 |
| 5,033,452 | 7/1991 | Carriere ............. 126/271.1 |

FOREIGN PATENT DOCUMENTS

| | | |
|---|---|---|
| 152350 | 11/1955 | Sweden . |
| 641048 | 1/1979 | U.S.S.R. .............. 126/271.1 |

OTHER PUBLICATIONS

Brochure entitled "Is Frozen Ground Putting a Freeze on Your Cold Weather Maintenance Budget?", distributed by Thawmaster, Minneapolis, Minn.

Brochure entitled "The Frost Hog by Leric–The Clean Efficient Economical Frost Removal System," distributed by Leric Holdings ltd., Lloydminster, Alberta, Canada.

Primary Examiner—James C. Yeung
Attorney, Agent, or Firm—Fredrikson & Byron

[57] ABSTRACT

The invention is a highly portable ground defrosting device that has a manually portable housing which includes a sidewall, a roof connected to the side wall and an open bottom. The side wall and roof each have a coefficient of thermal conductivity of less than about 0.6 BTU-in/hr-ft²-° F. at 400° F., and the side wall and roof together define an enclosed heating chamber. At least one port extends through the side wall for receiving a removable burner which substantially occupies and is exhausted through the one port so that the chamber is substantially airtight as the apparatus rests on the ground.

18 Claims, 5 Drawing Sheets

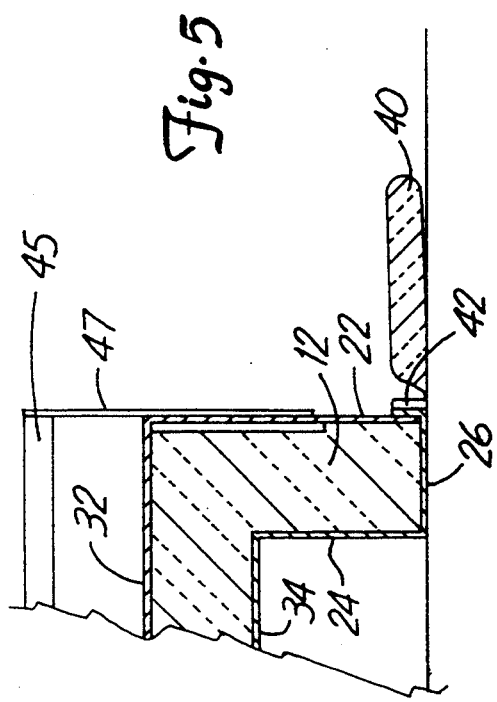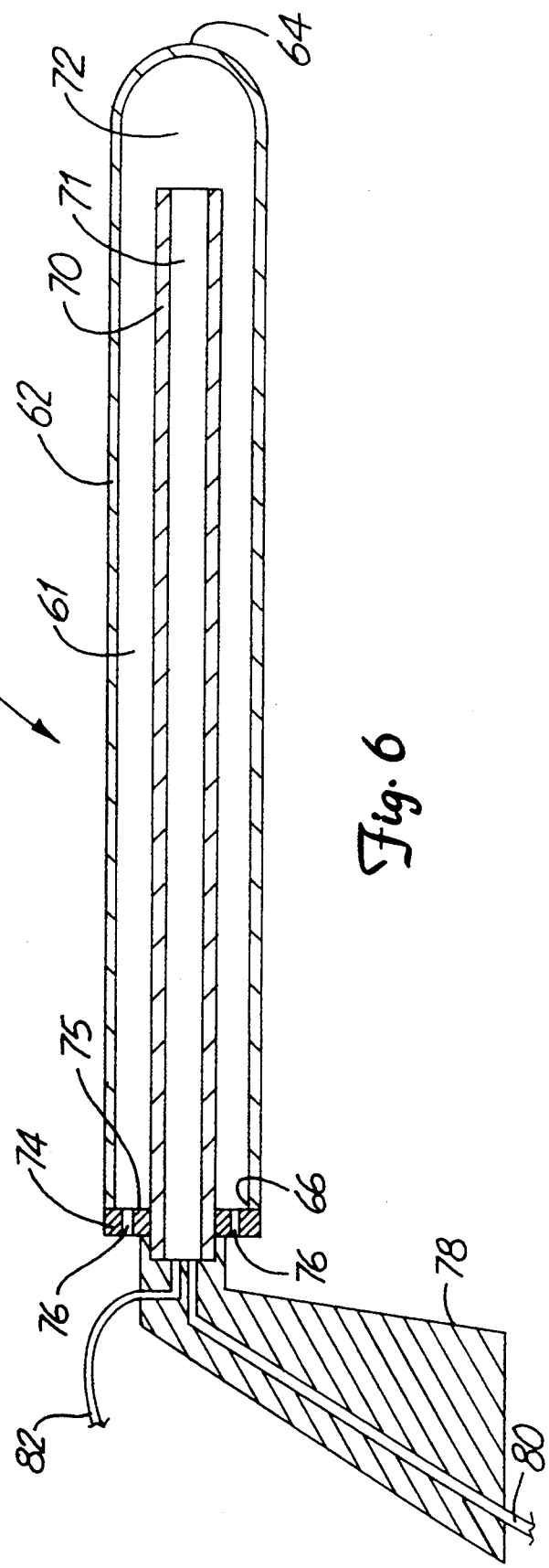

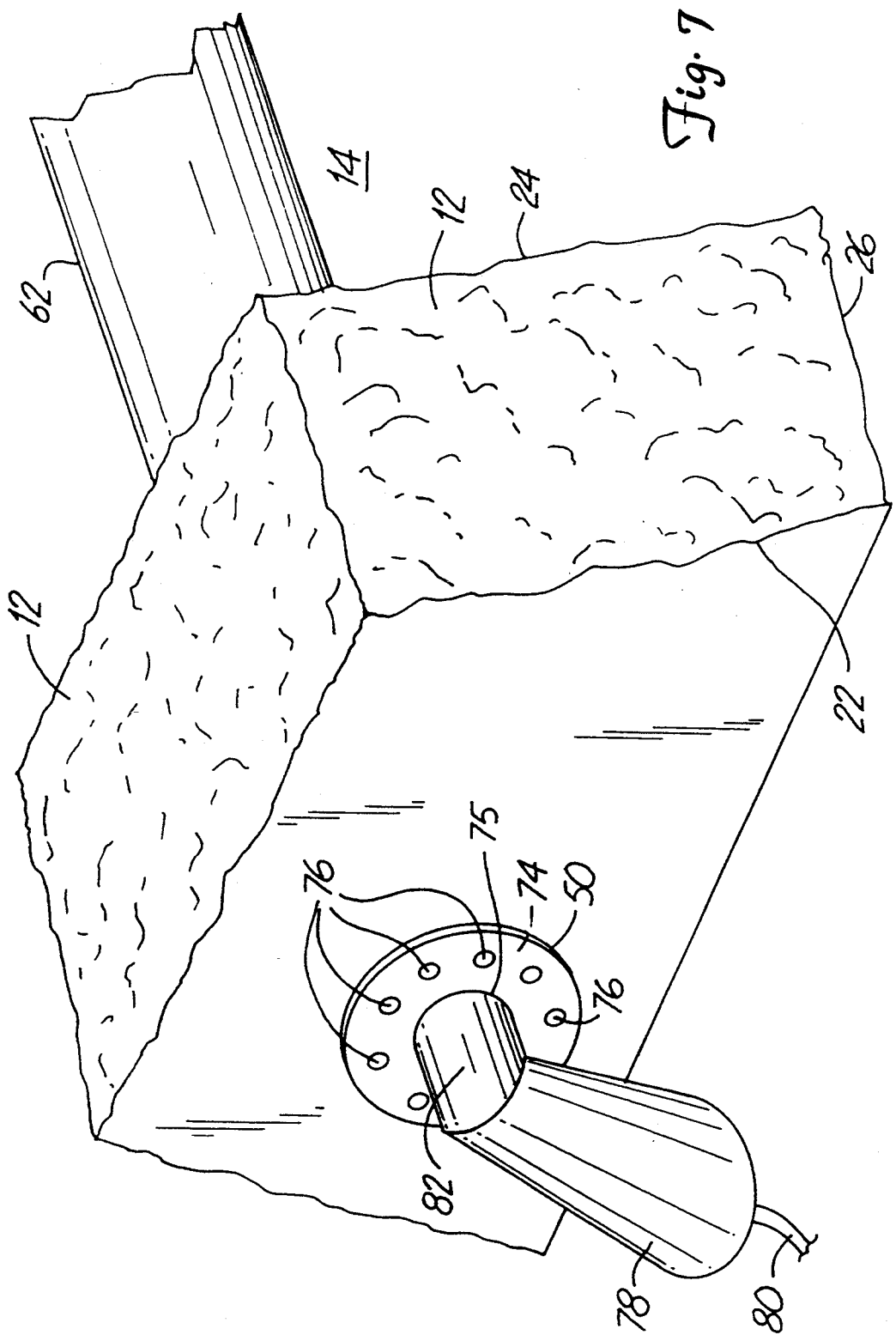

GROUND THAW APPARATUS

FIELD OF THE INVENTION

The present invention relates to devices that defrost frozen ground in preparation for excavating the ground to depths of three feet or more.

BACKGROUND

Many utility lines such as gas, electricity and water lines are buffed several feet below the surface of the earth. In order to service such utility lines, the ground above them must first be excavated. In cold climates, the ground freezes solid to depths of three to six feet, creating a cement-like barrier between the surface of the ground and the underground lines. Although it is possible to use pneumatic hammers to excavate the frozen ground, pneumatic hammers are labor intensive and the shock waves generated by the hammers may damage the very underground line for which access is sought. Also, in some jurisdictions it may be illegal to use power digging tools in the vicinity of oburied utilities. It is desirable to first defrost the frozen ground, and then manually excavate the ground.

U.S. Pat. No. 5,033,452 (Carriere) discloses a thawing device having a thermally insulated housing and a single undivided fire tube mounted within the housing. The fire tube has a first end connected to one port in the housing and a second end connected to another port in the housing. A burner is mounted in the first end of the fire tube, and a flue for exhausting the combustion gases is connected adjacent the second end. Heat radiates from the fire tube into the interior of the housing. The housing includes a pitched roof having a steam vent at its apex that extends between the interior and the exterior of the housing. The purpose of the steam vent is to collect and discharge steam generated during the thawing process within the housing. Some of the heat in the housing unavoidably escapes with the steam and air that is vented.

U.S. Pat. No. 4,349,010 (Bentham) discloses a frost removal system in which heating pipes are placed on the ground to be thawed and then covered with earth. In one embodiment, a generally cylindrical chamber includes a tangential inlet where a burner is mounted and a centrally disposed exhaust outlet extending upwardly through the earth covering.

Another ground thawing device, called "Frost Hog," is manufactured by Leric Holdings, Ltd., of Lloydminster, Alberta, Canada. The device includes a heavy trailer-mounted housing and a fire tube extending through the housing from one port to another port. A burner is positioned in the first port and a vertical flue for exhausting the combustion gases is positioned adjacent the second port. This device is said to burn approximately 200 pounds of propane to defrost the ground to a depth of four to five feet in about 24 hours.

Yet another ground thawing device, called the "Thawmaster," is manufactured by Thawmaster of Minneapolis, Minnesota. This device uses heating tubes that are disposed directly in holes that, in a preliminary step, are bored in the ground.

Desirably, a thawing device should be manually portable, require a minimum of site preparation, and be safe and efficient in operation.

SUMMARY OF THE INVENTION

The present invention is a highly portable defrosting device that, without requiring any preliminary site preparation, defrosts frozen ground in preparation for excavating the ground to depths up to six feet.

The ground defrosting device includes a manually portable housing having a sidewall, a roof connected to the sidewalls and an open bottom. The sidewall defines a heating chamber, and the sidewall and roof each have coefficients of thermal conductivity not greater than 0.6 BTU-in/hr-ft$^2$-° F. at 400° F. A removable burner extends through a port in the sidewall and into the heating chamber. The removable burner substantially occupies the port, and is exhausted through the same port, so that the heating chamber is substantially airtight when the device rests on the ground.

One objective of the present invention is to provide a device that will thaw frozen ground to a depth of approximately four feet in twenty-four hours. Another objective of the present invention is to provide a safe ground thawing device that has an operating temperature of less than 150° F. on its outermost surface. Yet another objective of the present invention is to provide an efficient ground thawing device that is cost effective to build and operate. Additionally, an objective of the present invention is to provide a ground thawing device that is convenient to store and transport.

These and other features of the invention will become more apparent upon reference to the following description of a preferred embodiment of the invention, and in particular, upon referring to the drawings.

BRIEF DESCRIPTION OF THE DRAWINGS

FIG. 5 is a broken-away cross-sectional view taken along line 5—5 of FIG. 1;

FIG. 6 is a cross-sectional view of a removable burner useful in the present invention;

FIG. 7 is a broken-away view showing mounting of the burner of FIG. 6; and

DETAILED DESCRIPTION OF A PREFERRED EMBODIMENT

Figure 1:
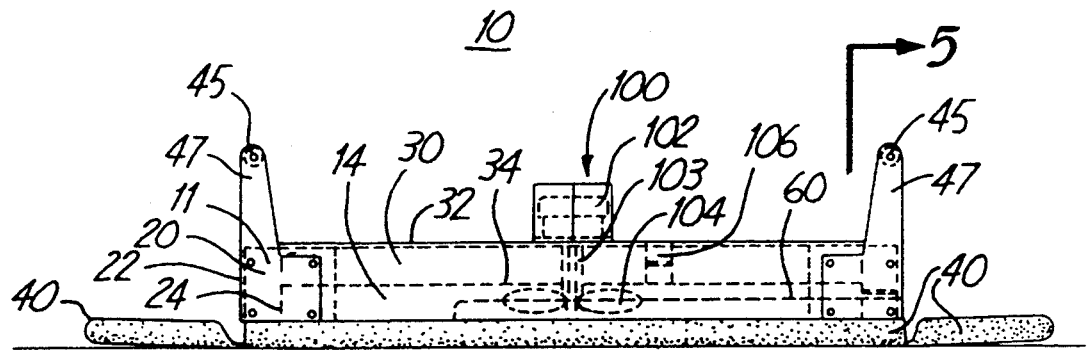
FIG. 1 is a front elevation view of a ground thawing device of the present invention.

FIGS. 1–5 depict a ground thawing device 10 embodying the present invention. The device 10 has a housing 11 which includes a sidewall 20 and a roof 30 supported by the sidewall. The shape of the sidewall 20 may be circular or any type of polygon such as a square, rectangle or hexagon. In a preferred embodiment, the sidewall 20 is rectangular and the housing is parallelpiped in shape with an open bottom. The shape of the roof 30 corresponds to the shape of the sidewall 20, and accordingly, the roof 30 is rectangular in a preferred embodiment. The sidewall 20 and roof 30 define a heating chamber 14 for trapping heat generated by a removable burner 60. The bottom of the device 10 is open so that heat generated within the heating chamber 14 is transferred to the ground (not shown) to be thawed. The sidewall 20 includes at least one port 50 for receiving a removable burner 60. In a preferred embodiment, the sidewall 20 includes four ports 50, 51, 52, 53, respectively, each for receiving a removable burner 60.

Figure 2:
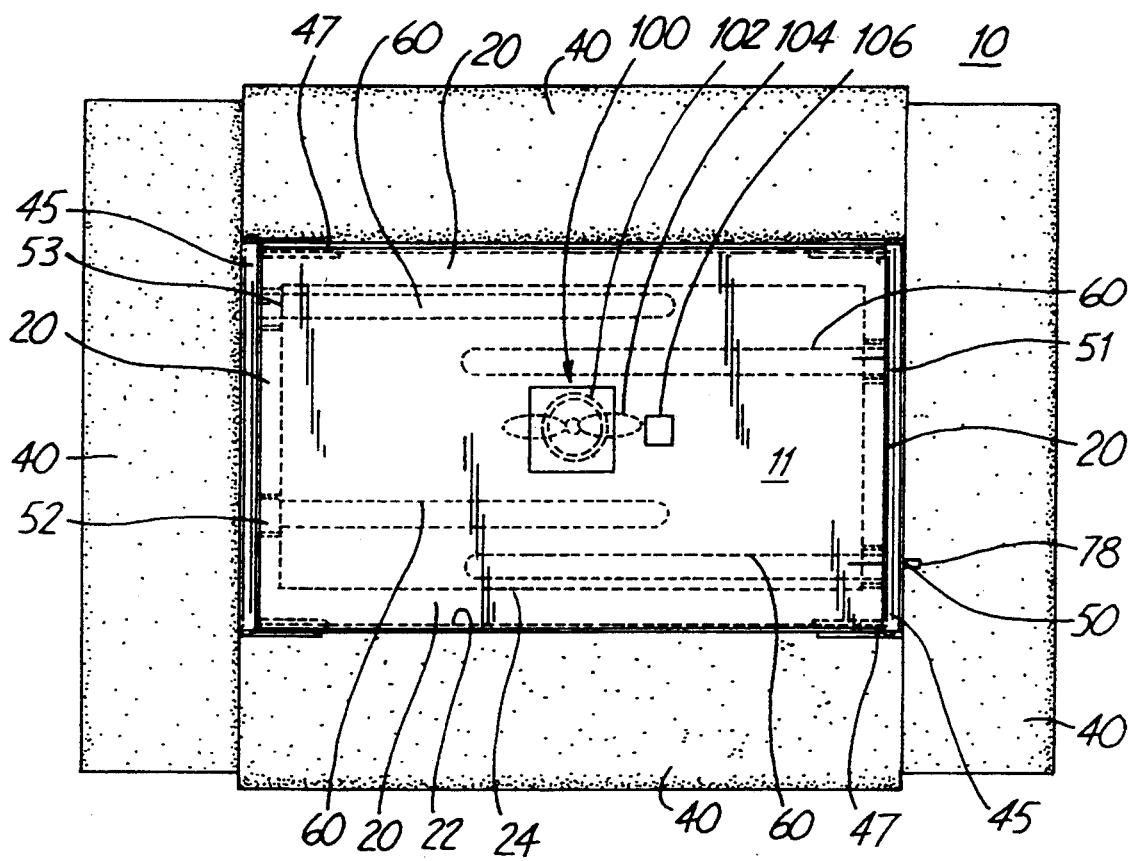
FIG. 2 is a top elevation view of the ground thawing device shown in FIG. 1.
Figure 3:
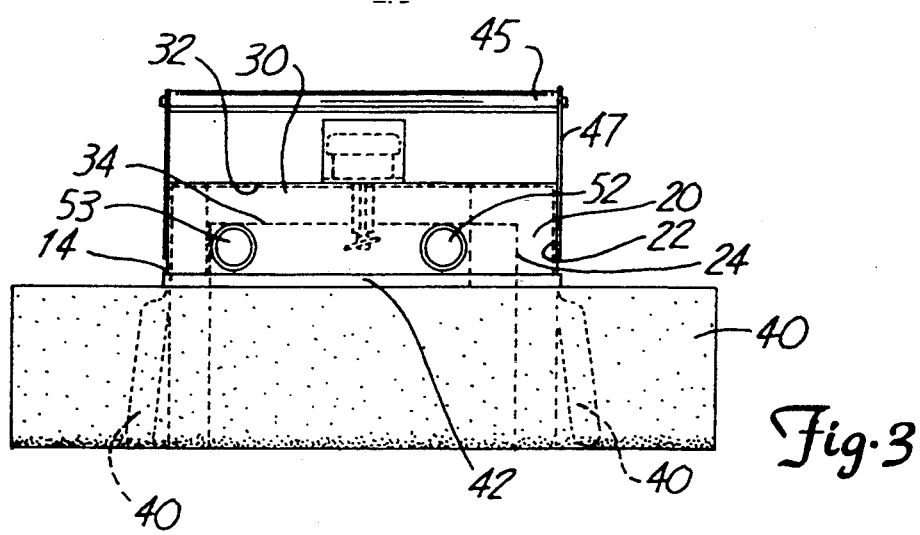
FIG. 3 is a side elevation view of the ground thawing device shown in FIG. 1.

Referring to FIGS. 1–3 and 5, a flexible skirt 40 is attached to the bottom of the sidewall 20 by a peripheral band 42 forming a skirt retainer. The flexible skirt 40 serves to insulate the ground peripherally of the sidewalls and prevent air from entering the heating chamber when the device is placed upon even ground, thus reducing the need for site preparation. FIGS. 1 and 2 show the flexible skirt 40 laying flat on the ground, while FIG. 3 shows the flexible skirt 40 hanging downward as it would when the device 10 is manually carded. The flexible skirt 40 is preferably made from spun, high purity ceramic fibers capable of resisting combustion at approximately 2500° F. One particularly well suited product is Fibermax ®, made by The Carborundum Company.

A pair of opposing handle brackets 47 are positioned on each end of the housing 11, and each pair of handle brackets 47 carries an elevated handle bar 45. The housing 11 is separate from both the removable burners 60 and the fuel supply (not shown); importantly, the housing 11 is manually portable as it can be manually lifted and moved when the burners 60 are removed. In order to be manually portable, the housing 11 generally weighs less than 200 pounds, and preferably less that 150 pounds. The manual portability of the housing 11, removable burners 60 and fuel supply allows the device 10 to be transported from one location to another in a regular pick-up truck without the need for a separate customized trailer. It will be appreciated that such manual portability reduces the manufacturing cost and increases the flexibility of the device 10.

Figure 4:
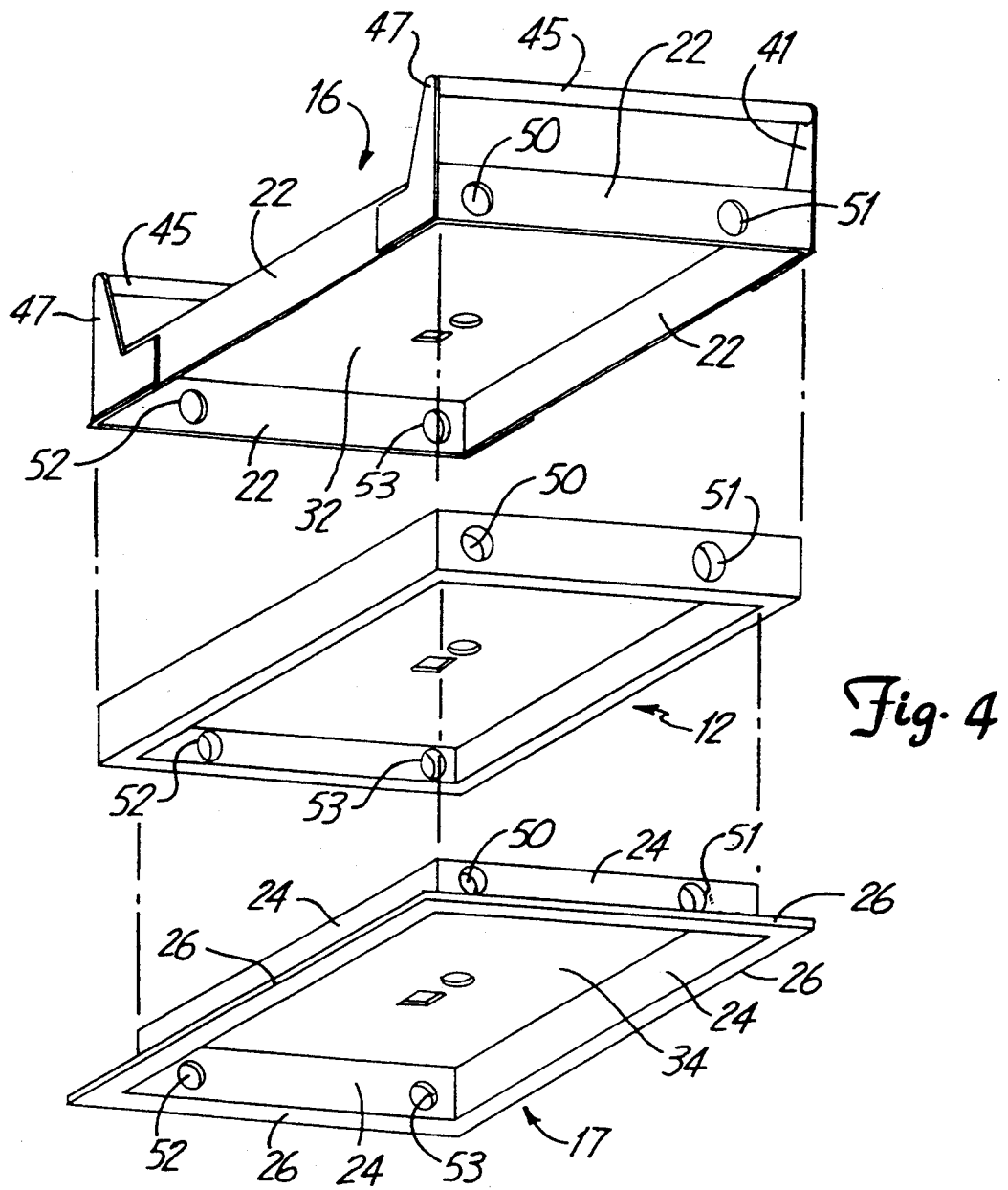
FIG. 4 is an exploded perspective view of a ground thawing device of the present invention.

In the preferred embodiment of the device 10, the sidewall 20 and roof 30 are each an insulated double hull having an outer shell, an inner shell and insulation therebetween. Referring to FIGS. 1–5, and particularly to FIG. 5, the sidewall 20 has an outer shell 22 and an inner shell 24. A flange 26 extends outwardly from the lower portion of the inner shell 24, and receives the bottom of the outer shell 22. Similarly, the roof 30 has an outer shell 32 and an inner shell 34. As shown in FIG. 4, the outer shell 32 of the roof 30 is connected to the outer shell 22 of the sidewall 20 to form an outer housing 16; and the inner shell 34 of the roof is connected to the inner shell 24 of the sidewall to form an inner housing 17. When assembled, the outer housing 16 is attached to the flange 26, and insulation 12 is positioned therebetween.

The inner housing 17 is made from steel or any suitable material capable of resisting high temperatures. In a preferred embodiment, the inner housing 17 is made from 22 gauge stainless steel. The outer housing 16 is made from steel, aluminum, alloys, composites or any other suitable material. The outer housing 16 does not need to be as resistant to high temperatures as the inner housing 17, and it should be made from the lightest material having sufficient strength so that it is easier to carry. In a preferred embodiment, the outer housing 16 is made from 0.05 inch thick aluminum.

The insulation 12 is made from a material having a coefficient of thermal conductivity of not greater than 0.6 BTU-in/hr-ft$^2$-° F. at 400° F., and preferable not greater than about 0.3–0.5 BTU-in/hr-ft$^2$-° F. at 400° F. One particularly well suited insulation is a Durablanket ® S (The Carborundum Company), a spun ceramic fiber insulation containing $Al_2O_3$ (40%), $SiO_2$ (52%), $ZrO_2$ (5%), $Fe_2O_3$ (0.6%), $TiO_2$ (1.5%) and other inorganics (0.85%). In a preferred embodiment, the insulated double hull sidewall 20 and roof 30 also has a coefficient of thermal conductivity not greater than 0.6 BTU-in/hr-ft$^2$-° F. at 400° F., and preferably not greater than about 0.3–0.5 BTU-in/hr-ft$^2$-° F. at 400° F.

It will be appreciated that the efficiency and safety of the device 10 will be enhanced by selecting an appropriate thickness of insulation 12. The thickness of the insulation 12 should be at least about 1.5 inches, and preferably about 3 inches. In a preferred embodiment, the thickness and thermal conductivity of the insulation are chosen so that when the units are used on days when the temperature is below 0° F., the temperature of the outer surface of the outer housing 17 increases only to about 20° F. above the ambient temperature even after operating four removable burners 60 for approximately twenty-four hours. Accordingly, when appropriately insulated, the device 10 is safe to touch and highly efficient because only a small amount of heat from the burners 60 is lost to the ambient air outside of the heating chamber 14 through the sidewall and roof.

In another embodiment of the invention, the efficiency of the device may be enhanced by reducing the volume of the interior chamber. By minimizing the height of the sidewall, the removable burners 60 are held lower to the ground and volume of the heating cavity is minimized. Accordingly, less heat is used to heat the air within the heating cavity, and the surface area of the chamber through which heat may be lost is reduced. In a preferred embodiment, the ratio of the height of the sidewall 20 to the area of the roof 30 is less than 0.075 ft/ft$^2$.

FIGS. 6 and 7 show a removable burner 60 according to the present invention. In a preferred embodiment, the removable burner 60 includes an elongated tubular casing 62 defining a tubular cavity 61 having a closed end 64 and an open end 66. The open end 66 of the casing 62 is closed by a vent cap 74 having a plurality of vent holes 76 and a central aperture 75. A heating element 70 extends through the central aperture 75 and into the tubular cavity 61 so that a flame 72 is emitted towards the closed end 64 of the casing 62. A handle 78 having a gas line 80 and a combustion air intake port 82 is attached to the heating element 70. The flame 72 is produced by introducing gas and air into a combustion chamber 71 of the heating element 70 and igniting the gas/air mixture before the heating element is positioned within the casing 62.

FIGS. 2 and 7 depict the relationship between a removable burner 60 and the housing 11. The device 10 has at least one, desirably at least two, and preferably four removable burners 60 positioned within the heating chamber 14. Each removable burner 60 is received through a port 50 so that the burner substantially occupies the port. When the removable burner 60 is positioned in a port, the vent plate 74 should be substantially flush with the outer shell 22. The air within the tubular cavity 61 of the removable burner 60 does not communicate with the air within the heating chamber 14. Instead, the combustion gases within the tubular chamber 61 of the removable burner 60 are vented through the vent holes 76 of the vent plate 74. Accordingly, the combustion gases of a removable burner 60 are exhausted through the same port through which the burner extends into the heating chamber.

By having the burner substantially occupy the port, and by also preventing communication between the air in the tubular cavity and the air in the heating chamber, the device 10 is substantially airtight when it is placed on the ground. The purpose of making the device 10 substantially airtight is to decrease heat loss in the system by preventing superheated vapor and air within the heating chamber from escaping into the ambient air.

The position of the removable burners 60 in the heating chamber 14 also enhances the efficiency of the device 10, thereby decreasing the time necessary to thaw the ground. Instead of emitting a flame at or near a port where heat will be lost through the port and out of the exhaust, the flame 72 of the present invention is emitted near the center of the heating chamber where the heat will only be lost out of the exhaust.

In another embodiment (not shown), the tubular casing 62 may be continuous and extend from a first port to a second port. In this embodiment, the flame 72 may be positioned near the first port and the combustion gases may be exhausted through the second port.

In a preferred embodiment of the device 10, a fan 100 may be positioned on the housing 11 to circulate air and water vapor within the heating cavity 14. In the present invention, the device 10 is generally a closed system having air and water vapor as the conductive medium for the heat radiating from the burners, and the fan 100 increases the efficiency of the device as it circulates air within the heating chamber 14.

The fan 100 includes a motor 102 positioned on the exterior of the roof 30. The motor 102 is operatively connected to a drive shaft 103 which extends through the roof 30 into the combustion chamber 14. In a preferred embodiment, the drive shaft 103 is sealed in a passageway through the roof 30 so that air and water vapor cannot escape from the heating chamber 14. The drive shaft 103 turns the propeller 104, which circulates the air and water vapor within the heating chamber 14.

The motor 102 is an electrical motor driven by a power supply 106 such as a battery, solar cell or thermo-electric generator. In a preferred embodiment, the power supply 106 is a thermo-electric generator that uses the temperature differential between the ambient air and the heating chamber to produce an electrical current. One particularly well suited thermoelectric generator is the HZ-13 Thermoelectric Module manufactured by Hi-Z Technology, Inc.

Figure 8:
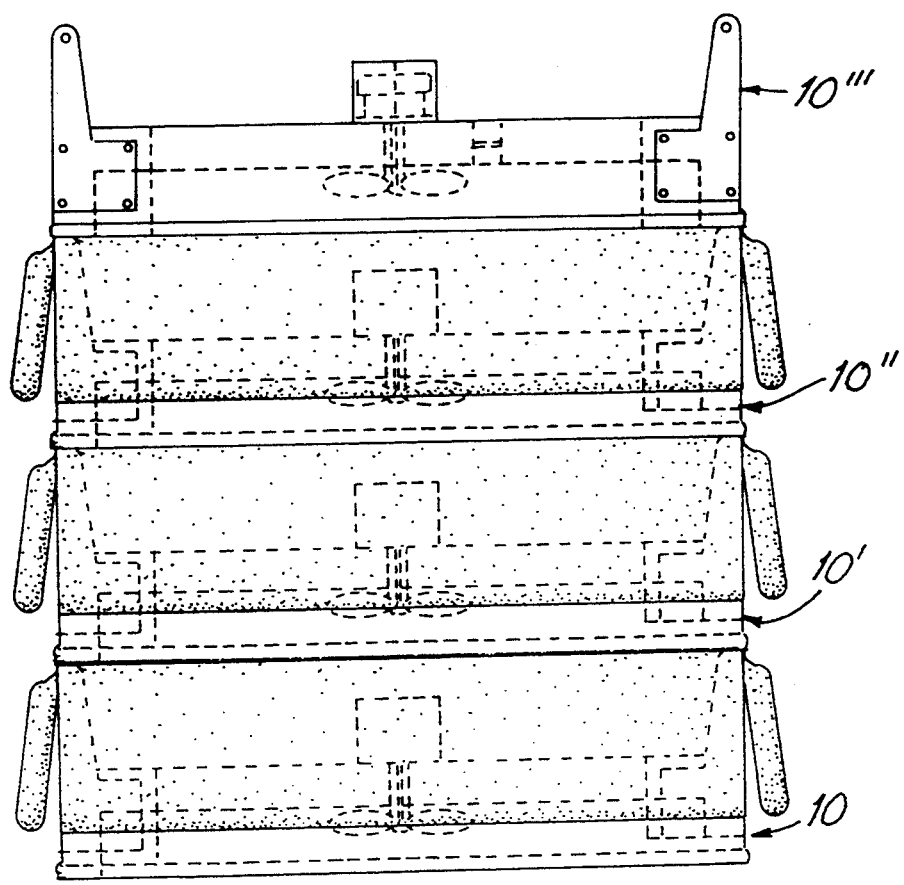
FIG. 8 is a front elevation view of several ground thawing devices of the present invention stacked on top of each other.

Referring to FIG. 8, several ground thawing devices 10, 10', 10" and 10''' can be stacked on top of each other for transport or storage by first removing the burners from the housings. Stacking the devices as shown in FIG. 18 allows several devices to be stored or transported in a relatively small space. As such, the ground thawing devices of the present invention are inexpensive to store and transport.

In a ground thawing procedure using the present invention, the housing 11, removable burners 60 and a gas supply are loaded onto a common transportation vehicle, and hauled to an excavation site. The housing 11 is positioned over the exact location to be excavated. Two people can easily life and carry the device. The manual portability of the device eliminates the need for customized equipment for transportation or positioning.

After the housing 11 is appropriately positioned and the flexible skirt is deployed as shown in FIG. 1, the heating element 70 of each removable burner 60 is ignited and the removable burners are inserted into the heating chamber 14 through the ports 50, 51, 52, 53. The device 10 is then left for an appropriate time period to thaw the ground to the desired depth. In the case where the gas supply is propane, the device 10 thaws frozen ground to a depth of 4 feet in about 24 hours using approximately 30 pounds of propane. During such an operation, the external temperature on the outer housing does not exceed approximately 20° F. above the ambient air temperature, even when the ambient air temperature is less than 0° F.

The advantages of the present invention include cost effective and comparatively safe thawing of frozen ground. The present invention is cost effective because, compared to current devices, it is simple to build, uses less fuel, has generally faster thaw times, requires little site preparation, and does not need custom transportation equipment. The present invention is comparatively safe because the exterior of the housing 11 is not hot enough to burn skin.

While a preferred embodiment of the present invention has been described, it should be understood that various changes, adaptations and modifications may be made therein without departing from the spirit of the invention and the scope of the appended claims.

What is claimed is:

1. A ground thawing device, comprising:
a manually portable housing including a sidewall, a roof connected to the sidewall, and an open bottom, the sidewall and roof together defining an enclosed heating chamber, and the sidewall and roof each having a coefficient of thermal conductivity less than about 0.6 BTU-in/hr-ft$^2$-° F. at 400° F.;
at least one port extending through the sidewall for receiving a removable burner;
a removable burner received in the port and extending into the heating chamber, the burner substantially occupying and being exhausted through the at least one port so that the chamber is substantially airtight as the apparatus rests on the ground.

2. The ground thawing device of claim 1, wherein the sidewall and roof are each comprised of an outer shell and an inner shell spaced inwardly from the outer shell, the outer shell of the roof being connected to the outer shell of the sidewall to form an outer housing and the inner shell of the roof being connected to the inner shell of the sidewall to form an inner housing, and insulation being disposed between the outer and inner housings, the heating chamber being defined by the inner housing.

3. The ground thawing device of claim 2, wherein the insulation is made from spun ceramic fibers and has a coefficient of thermal conductivity less than about 0.6 BTU-in/hr-ft$^2$-° F. at 400° F.;

4. The ground thawing device of claim 2, wherein the burner further comprises a tubular casing having a closed end and an open end forming a tubular cavity with an open end, a heating element received in the cavity through the open end so that a flame is emitted towards the closed end, and a vent plate positioned in the open end of the casing between the casing and the heating element for supporting the heating element and venting exhaust gases from the cavity.

5. The ground thawing device of claim 5, further comprising:
a fan for circulating air within the heating chamber, the fan having a propeller positioned in the heating chamber and a motor positioned outside of the heating chamber; and
a power supply for driving the motor of the fan.

6. The ground thawing device of claim 11, wherein the power supply is a thermo-electric generator.

7. The ground thawing device of claim 2, further comprising a flexible skirt attached to the outer housing, the skirt being positioned about the perimeter of the outer housing so as to lay on the ground about the perimeter of the outer housing.

8. The ground thawing device of claim 1, wherein the burner further comprises a tubular casing having a closed end and an open end, a heating element received in the casing through the open end so that a flame is emitted towards the closed end, and a vent plate positioned in the open end of the casing between the casing and the heating element for supporting the heating element and venting exhaust gases from the casing.

9. The ground thawing device of claim 1, wherein the ratio of sidewall height to the roof area is less than 0.075 ft/ft$^2$.

10. The ground thawing device of claim 1, further comprising a flexible skirt attached to the sidewall, the skirt being positioned about the perimeter of the sidewall and extending outwardly therefrom for contact with the ground.

11. The ground thawing device of claim 7, wherein the skirt is made from a spun ceramic fiber.

12. The ground thawing device of claim 1, further comprising:
- a fan for circulating air within the heating chamber, the fan having a propeller positioned in the heating chamber and a motor positioned outside of the heating chamber; and
- a power supply for driving the motor.

13. The ground thawing device of claim 12, wherein the power supply is a thermo-electric generator.

14. A ground thawing device, comprising:
- a manually portable housing including a sidewall, a roof connected to the sidewall, and an open bottom, the sidewall and roof together defining an enclosed heating chamber, and the sidewall and roof each having a coefficient of thermal conductivity less than about 0.6 BTU-in/hr-ft$^2$-° F. at 400° F.;
- at least two ports extending through the sidewalls for receiving removable burners;
- a removable burner received in each port and extending into the heating chamber, each burner substantially occupying and being exhausted through its corresponding port so that the chamber is substantially airtight as the apparatus rests on the ground.

15. The ground thawing device of claim 14, wherein the sidewall and roof are each comprised of a insulated double hull having an outer shell and an inner shell spaced inwardly apart from the outer shell, the outer shell of the roof being connected to the outer shell of the sidewall to form an outer housing and the inner shell of the roof being connected to the inner shell of the sidewall to form an inner housing, and insulation having a thermal conductivity less than about 0.6 BTU-in/hr-ft$^2$-° F. at 400° F. being disposed between the outer and inner housings, the heating chamber being defined by the inner housing.

16. The ground thawing device of claim 15, wherein each burner further comprises a tubular casing having a closed end and an open end, a heating element received in the casing through the open end so that a flame is emitted towards the closed end, and a vent plate positioned in the open end of the casing between the casing and the heating element for supporting the heating element and venting exhaust gases from the casing.

17. The ground thawing device of claim 14, further comprising:
- a flexible skin attached to the outer housing, the skirt being positioned about the perimeter of the outer housing and extending outwardly therefrom to contact the ground;
- a fan for circulating air within the heating chamber, the fan having a propeller positioned in the heating chamber and a motor positioned outside of the heating chamber; and
- a power supply for driving the motor.

18. A ground thawing apparatus, comprising:
- a manually portable housing including a sidewall, a roof connected to the sidewall, and an open bottom, the sidewall and roof each having an outer shell and an inner shell spaced inwardly apart from the outer shell, the outer shell of the roof being connected to the outer shell of the sidewall to form an outer housing and the inner shell of the roof being connected to the inner shell of the sidewall to form an inner housing, and insulation having a thermal conductivity of less than about 0.6 BTU-in/hr-ft$^2$-° F. at 400° F. being disposed between the outer and inner housings, the inner housing defining an enclosed heating chamber;
- at least two ports extending through the sidewall, each port for receiving a removable burner;
- a removable burner received in each port and extending into the heating chamber, each burner including a tubular casing having a closed end and an open end forming a tubular cavity with an open end, a heating element received in the cavity through the open end so that a flame is emitted towards the closed end, and a vent plate positioned in the open end of the casing between the casing and the heating element for supporting the heating element and venting exhaust gases from the cavity, each burner substantially occupying and being exhausted through its corresponding port so that the chamber is substantially airtight as the apparatus rests on the ground;
- a flexible skirt attached to the outer housing, the skirt being positioned about the perimeter of the outer shell and extending outwardly therefrom to contact the ground;
- a fan for circulating air within the heating chamber, the fan having a propeller positioned in the heating chamber and a motor positioned outside of the heating chamber; and
- a remote power source for driving the motor.

* * * * *